May 23, 1933. C. W. MABEY 1,910,620
BUN CORRUGATOR
Filed Aug. 14, 1931

Inventor,
Charles W. Mabey,
By Minturn & Minturn,
Attorneys.

Patented May 23, 1933

1,910,620

UNITED STATES PATENT OFFICE

CHARLES W. MABEY, OF INDIANAPOLIS, INDIANA, ASSIGNOR TO MABEY ELECTRIC AND MANUFACTURING COMPANY, OF INDIANAPOLIS, INDIANA

BUN CORRUGATOR

Application filed August 14, 1931. Serial No. 557,064.

This invention relates to the art of toasters and particularly to a type of toaster adapted to form toasted corrugations or grooves in the cut face of a bun.

An object of the invention is to provide a device whereby one or more grooves may be formed in a bun and the surface of the grooves toasted so as to have the grooves retain their shape.

An object of the invention is to provide a toasting device for the forming of grooves in a bun which is adapted to apply pressure according to the degree of moisture in the bun.

An object of the invention is to provide a ribbed toasting surface over which a compensating pressure plate is mounted to press a bun against the ribbed surface and there retain it irrespective of the thickness of the bun or parts thereof.

Figure 1:
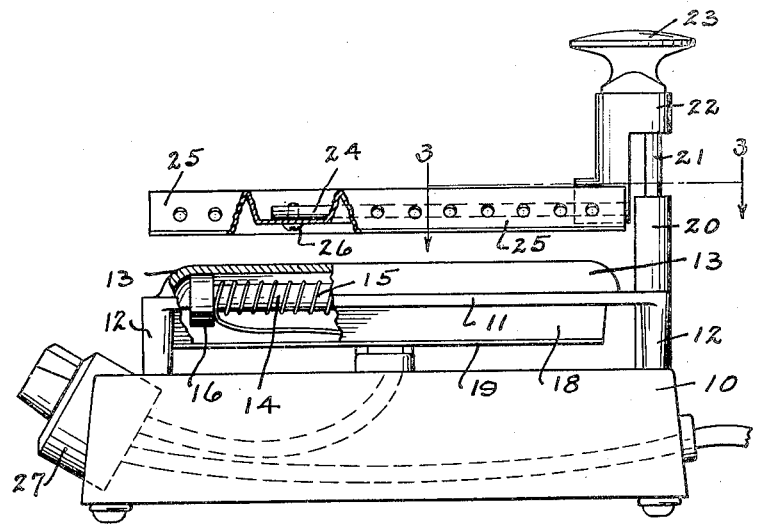
Figure 2:
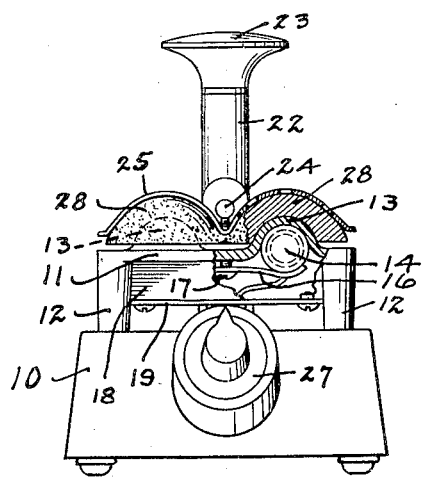
Figure 3:
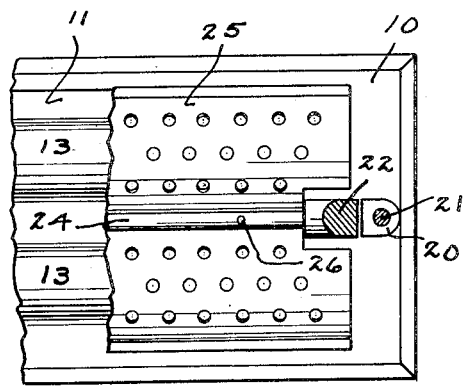

These and other objects such as the associating of the particular elements as set forth by the accompanying claims for the purpose of providing a toaster of low cost and economical as well as easy operation, will become apparent in the following description of the invention as illustrated by the accompanying drawing, in which Fig. 1 is a fragmentary side elevation of the toaster embodying my invention;

Fig. 2, a fragmentary front elevation of the toaster;

Fig. 3, a horizontal section on the line 3—3 in Fig. 1; and

Figure 4:
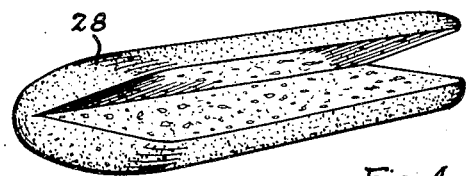

Fig. 4, a perspective view of a bun cut preliminary to its being opened up and toasted.

Like characters of reference indicate like parts in the several views in the drawings.

Upon a suitable base 10 here shown as being rectangular shaped and hollow to serve as a heating insulator, I mount the toasting plate 11 in spaced relation thereabove by securing the posts 12 to the base 10, the posts 12 being at the corners of the plate 11. The upper side of the plate 11 has a number of ribs 13, here shown as two in number projecting upwardly from its top side in longitudinal spaced apart parallel relation.

Each of the ribs 13 defines a cavity thereunder into which is placed a spool 14 of some insulating material, preferably porcelain, about which spool is wound a resistance wire 15 to serve as a heating medium when a suitable supply of current is passed therethrough. The spools 14 are held in position under the ribs 13 by means of a transverse plate 16 bearing against the outer ends of the spools by its respective ends and drawn toward the under side of the plate 11 by screw 17 which screw-threadedly enters the plate 11. The plate 11 has a depending wall 18 and an undercover plate 19 which completely encloses the spools 14 from the under side. These spools 14 have enlarged heads which contact with the under sides of the ribs 13 to hold the wire 15 spaced therefrom.

At the rear end of the plate 11 is a vertically disposed post 20 which has its lower end secured to the base 10 and its upper end extending well above the plate 11. This post 20 is bored vertically therethrough to slidably receive a rod 21. To the upper end of the rod 21 is secured a bracket 22 on the upper side of which is an operating button 23. The forward side of the bracket 22 extends downwardly along but spaced forwardly of the rod 21 and carries a pin 24 to extend horizontally forwardly from the lower end thereof. The rear side of this lower extension of the bracket 22 has a flat surface which is adapted to come just in front of a a similar flat surface on the forward side of the post 20 whereby there is a slight clearance between these two surfaces such that upon rotation of the bracket 22, the rear flat surface of the bracket 22 will come into contact with the flat surface on the forward side of the post 20 and limit the rotation. When the bracket 22 is lifted upwardly sufficiently to have its under side above the post 20, the bracket 22 may then be swung around without the two flat surfaces coming into contact one with another.

A plate 25 is loosely secured against the under side of the rod 24 by means of screws 26 so that the plate is allowed to have a slight rotary movement around the underside of the rod. This plate 25 extends upwardly on each side of the rod 24 and then curves around and downwardly whereby a cross section through the plate shows it to have two symmetrical inverted U-shaped portions one on each side of the rod. The two U-portions or sections are symmetrically disposed about and above the ribs 13 when the plate 25 is lowered thereover. A suitable switch 27 is mounted on the forward end of the base 10 to control the flow of current through the resistance wires 15.

In using the toaster, a bun 28 is first slit from one longitudinal edge, Fig. 4, to divide the bun into two symmetrical halves as nearly as possible and to leave a slight thickness of bun along the other longitudinal edge to serve as a hinge about which the two halves may then be swung open to permit the bun to be placed with the cut sides downwardly over the ribs 13, Fig. 2. With the bun 28 thus being cut and opened up and placed over the ribs 13, the plate 25 is lowered over the bun by pressing down on the button 23. Pressure is applied on the button 23 to force the bun 28 against the ribs 13 so as to cause the ribs to form grooves or depressions in the bun. The plate 25 will remain against the bun 28 in a locked position by reason of the resilient reaction of the bun against the plate tending to lift it upwardly whereby the post 21 is tended to be rocked and causes it to bind within the post 20. The degree of freshness of the bun determines largely the amount of pressure which should be applied through the plate 25 against the bun to produce the desired depth of grooves or corrugations in the bun. The fresher the bun is, the less pressure required.

The plate 25 is perforated in order to permit the escape of steam from the bun while being toasted. The current is allowed to flow through the resistance wires while the bun is pressed against the ribs 13 in order to toast the surfaces of the grooves and thus bake them into a more or less permanent shape which requires but a few seconds to form and toast these corrugations since a slight toasting or baking of the surfaces thereof is sufficient to retain the shape. When the corrugation has been formed, the button 23 is pulled upwardly and revolved to swing the plate 25 out of the way and the bun is then removed. By folding the bun together again, the groove formed in each section thereof will match one with the other and suitable filling may be placed therein as may be desired to form a sandwich. The filling of course may be placed in each of the grooves or corrugations before the two halves are folded together which permits the uniform and easy placing of the filling.

Since the bun 28 may not always be cut exactly on its central plane, one of the sections may be thicker than the other but this condition is of no consequence since the plate 25 may rock about the pin 24 sufficiently to let one side rise to accommodate the thicker bun portion thereunder and the other side of the plate lowered to come into contact with the thinner portion. Also it is to be noted that by reason of the flat surfaces provided on the adjacent sides of the lower extension of the bracket 22 and the forward face of the post 20, the plate 25 is more or less guided into the proper position to bring the rod 24 over the center of the plate 25 substantially equi-distant between the two ribs 13. Since the heat is applied to the bun through the ribs only, the center portion of the bun does not become toasted and hence is not dried out to such an extent that it would break when the two parts of the bun are folded back together.

While I have here shown and described my invention in the best form that is now known to me, it is obvious that structural changes may be made without departing from the spirit of the invention and I, therefore, do not desire to be limited to that precise form beyond the limitations imposed by the accompanying claims.

I claim:

1. For forming a corrugation in a pre-baked bun, the combination of a plate, a rib projecting upwardly from the plate, a heating element under the rib, a second plate which is non-heated and movable relative to the first plate to press the bun over said rib and a bar connected with the second plate through which pressure is applied to move the second plate toward the first plate.

2. For forming a groove in a pre-baked bun, a plate, a rib projecting from the plate, a heating element under the rib, and a non-heated, perforated plate adapted to be pushed against a bun to press it over said rib.

3. For forming a corrugation in a pre-baked bun, the combination of a plate, a rib projecting upwardly from the plate, a heating element under the rib, and a second plate adapted to press the bun over said rib, a post, and a rod slidably carried vertically through the post, said second plate being supported from the upper end of said rod so that the rod may be raised and lowered to correspondingly move said second plate but so that said rod will be rocked sideways in said post to cause it to bind therein and resist vertical movement under the weight of or resistance applied to said second plate.

4. For forming grooves in a pre-baked bun which has been cut and opened to present cut surfaces, a plate, a plurality of spaced apart ridges projecting from the plate, means for heating said ridges and a second plate corrugated to fit over said ridges, the corrugations of the second plate being non-heated and somewhat wider than the ridges, said second plate being adapted to fit over the outer sides of the cut bun and employed to press the cut faces of the bun over said ridges and there hold the bun while the heated ridges toast or bake the grooves into permanent form and a push rod to move the second plate toward the ridges.

5. For forming grooves in a pre-baked bun which has been cut and opened to present cut surfaces, a plate, a plurality of spaced apart ridges projecting from the plate, means for heating said ridges and a second plate corrugated to fit over said ridges, the corrugations of the second plate being somewhat wider than the ridges, said second plate being adapted to fit over the outer sides of the cut bun and be employed to press the cut faces of the bun over said ridges and there hold the bun while the heated ridges toast or bake the grooves into permanent form, said second plate being non-heated and perforated to permit the escape of steam therethrough.

6. For forming grooves in a pre-baked bun which has been cut and opened to present cut surfaces, a plate, a plurality of spaced apart ridges projecting from the plate, means for heating said ridges and a second plate corrugated to fit over said ridges, the corrugations of the second plate being somewhat wider than the ridges, said second plate being adapted to fit over the outer sides of the cut bun and be employed to press the cut faces of the bun over said ridges and there hold the bun while the heated ridges toast or bake the grooves into permanent form, a post adjacent said first plate, and a rod vertically slidable through said post, said second plate being supported by said rod.

7. For forming grooves in a pre-baked bun which has been cut and opened to present cut surfaces, a plate, a plurality of spaced apart ridges projecting from the plate, means for heating said ridges and a second plate corrugated to fit over said ridges, the corrugations of the second plate being somewhat wider than the ridges, said second plate being adapted to fit over the outer sides of the cut bun and be employed to press the cut faces of the bun over said ridges and there hold the bun while the heated ridges toast or bake the grooves into permanent form, a post adjacent said first plate, a rod vertically slidable through the post, a bracket on the upper end of the rod, and means limiting the rotary movement of the bracket about said post when the bracket is in a lowered position, said second plate being supported from said bracket.

8. For forming grooves in a pre-baked bun which has been cut and opened to present cut surfaces, a plate, a plurality of spaced apart ridges projecting from the plate, means for heating said ridges and a second plate corrugated to fit over said ridges, the corrugations of the second plate being somewhat wider than the ridges, said second plate being adapted to fit over the outer sides of the cut bun and be employed to press the cut faces of the bun over said ridges and there hold the bun while the heated ridges toast or bake the grooves into permanent form, means for supporting said second plate in selective vertical positions, said means including a horizontally disposed member about which said second plate may rock to permit it to accommodate itself to varying thicknesses of different portions of the bun.

9. The herein described method of preparing a baked product for sandwiches which consists in slicing the product from one edge to near the opposite edge to form a hinge connecting the members separated by slicing, opening the sliced members on the hinge, pressing a groove in the sliced surfaces of the members and then toasting the walls defining the grooves for a period sufficient to produce a substantially rigid permanently walled groove.

In testimony whereof I affix my signature.

CHARLES W. MABEY.